United States Patent Office 3,517,078
Patented June 23, 1970

3,517,078
PREPARATION OF BENZENE FROM TOLUENE
Massimo Simonetta, Milan, Italy, assignor to Societa Italiana Resine S.p.A., Milan, Italy, an Italian joint-stock company
No Drawing. Filed Sept. 13, 1968, Ser. No. 759,799
Claims priority, application Italy, Sept. 20, 1967, 20,654-A/67, Patent 811,815
Int. Cl. C07c 3/00, 3/58
U.S. Cl. 260—672  4 Claims

ABSTRACT OF THE DISCLOSURE

Hydrodealkylation of toluene is synergized by poly-iso-propylbenzenes available as distillation residues of cumene manufacture. Economical disposal of such residues with recovery of their benzene values is accomplished by dealkylation of 0.5–20% blends in toluene.

---

The invention relates to the preparation of benzene by dealkylation of toluene in the presence of hydrogen.

Various hydrodealkylation processes can be used, in which hydrogen and alkyl-aromatic hydrocarbons are contacted in a reaction zone at high temperature and pressure.

In these processes the reaction zone can contain solid substances having a catalytic action on the hydrodealkylation reaction, such as iron, cobalt and nickel in the form of free metals or oxides, or it can contain subdivided solid substances which are inert towards the reaction. Alternatively, reactors without any solid material can be employed.

These hydrodealkylation reactions, whether of a thermal or catalytic nature, have various drawbacks. For instance, with catalytic processes the drawbacks are mainly in heavier investment on the catalyst and its periodic regeneration; moreover, alkyl-aromatic compounds of a sufficiently wide composition spectrum cannot be utilized in the feed.

The drawbacks of the thermal hydrodealkylation processes are in lower efficiency, and inherently lower yield and conversion per pass as compared to the catalytic processes. Thus, in thermal hydrodealkylation of toluene, which is largely used in preparing benzene, partial conversions only per pass are maintained in order to keep the reaction conditions, more particularly temperature, within acceptable limits.

A further drawback consists in the formation of polycyclic aromatic hydrocarbons having non-condensed nuclei, such as diphenyls.

It has now been found that toluene can be dealkylated in the presence of hydrogen but in the absence of solid catalytic substances, with good results, by carrying out the reaction in the presence of small quantities of benzene derivatives in which at least one hydrogen atom is replaced by alkyl groups having two to four carbon atoms per group.

Among benzene derivatives isopropylbenzene and poly-isopropylbenzenes are preferred; moreover, mixtures which essentially comprise di-isopropylbenzenes are particularly suitable, such as the foots in the distillation of cumene prepared by catalytic synthesis from benzene and propylene.

These substances, which become effective when they are present in quantities of 0.5 to 20% by weight with respect to the toluene feed, preferably 1.0 to 10%, are converted to benzene during the hydrodealkylation reaction of toluene and exert at the same time a catalytic action.

Consequently, all other conditions being equal, higher conversions of toluene per pass are obtained as compared with the thermal processes discussed earlier or, the conversions being equal, the reaction can be carried out at lower temperatures or with less clumsy apparatus.

Moreover, the process according to the invention affords a higher selectivity in the toluene hydrodealkylation process; thus, non-condensed polycyclic aromatic hydrocarbons are substantially absent, resulting in higher yields and, on the other hand, in removal of the need for recycling them to the reaction zone.

The fundamental advantages of the process according to the invention in its preferred form lie therefore in a higher reaction speed and improved selectivity over conventional thermal processes, together with the ability to use simplified apparatus and an inherently simplified mode of operation of it.

In the preferred embodiment the dealkylation reaction of toluene in the presence of hydrogen is carried out in the absence of solid material, catalytic or not; however, operation can be carried out in the presence of solid subdivided materials that have no catalytic action on the reaction.

Though any type of dealkylation reactor is useful for the purposes of the invention, the preferred embodiment employs reactors of a tubular form of a high length to diameter ratio. In this case, the whole of the toluene is fed to the foot of the reactors together with a fraction of the hydrogen, after heating. The remaining hydrogen portion is fed at low temperature by one or a plurality of feeds along the reactor body so as to control the thermal effects of reaction. The necessary alkyl derivatives of benzene can be fed together with the toluene to the foot of the reactor or laterally, or in part to the bottom and in par laterally.

The temperatures at which the hydrodealkylation reaction takes place are desirably 600° to 800° C., the pressure being between 30 and 70 atm. and the hydrogen/toluene plus benzene alkyl derivatives molar ratio between 1.5:1 and 20:1, preferably 3:1 to 10:1.

Hydrogen or a gas containing, preferably, over 70% hydrogen can be employed.

The reaction times depend upon the desired conversion rate and the quantity of added benzene alkyl derivatives and are preferably between 1 and 60 sec.

The process is illustrated by the following example, preceded by a comparative run of a process not according to the invention.

COMPARATIVE RUN

A reactor made of nickel alloy is employed, of tubular shape, 12 mm. in diameter and 50 ml. effective volume.

The reactor is provided with thermocouples for measuring temperatures, admission and pre-heating arrangements for the reagents and cooling and recovery arrangements for the liquid products.

As a hydrocarbon charge toluene (100% by moles) and hydrogen are employed, the hydrogen/toluene molar ratio being 7:1.

A total pressure of 40 atm. is maintained in the reactor, the reaction temperature being 700° C.

The reaction time is 34.5 seconds.

The monocyclic aromatic compounds recovered in the liquid reaction products, expressed as percent by moles, are:

|  | Percent |
| --- | --- |
| Benzene | 83.6 |
| Toluene | 11.2 |

EXAMPLE

The process is carried out as in the comparative run, but with the difference that the hydrocarbon feed contains 92% by weight toluene and 8% of a mixture of the by-products of cumene synthesis from propylene and benzene, of the following composition by weight (determined by gas-chromatographic analysis):

| | Percent |
|---|---|
| p-Di-isopropylbenzene | 43.1 |
| m-Di-isopropylbenzene | 28.0 |
| o-Di-isopropylbenzene | 11.7 |
| Light products | 0.5 |
| Heavy products | 16.6 |

Considering these products to be formed by di-isopropylbenzenes only, the feed charge by moles is to a fair approximation:

| | Percent |
|---|---|
| Toluene | 95 |
| Alkyl derivatives of benzene | 5 |

In this case the hydrogen/toluene plus added hydrocarbon molar ratio is 7.

The monocyclic aromatic compounds recovered in the liquid reaction products expressed as percent by moles, are:

| | Percent |
|---|---|
| Benzene | 93.7 |
| Toluene | 5.2 |

I claim:
1. Process for preparing benzene by thermal dealkylation of toluene in the presence of hydrogen, and in the absence of catalytic substances, at elevated temperature and pressure, characterized by the steps of:
 (a) supplying to a dealkylation reactor a hydrocarbon mixture consisting essentially of toluene and cumene distillation bottoms obtained by catalytic synthesis from benzene and propylene, said bottoms being supplied in a proportion of 0.5–20 weight percent based on toluene;
 (b) supplying hydrogen to said reactor in an amount such that the molar ratio of hydrogen to alkyl aromatic hydrocarbons is from 1.5:1 to 20:1;
 (c) operating the dealkylation at 600° C.–800° C. and 30–70 atmospheres pressure within a time period of from 1 to 60 seconds; and
 (d) recovering benzene from the normally liquid reaction products.
2. Process of claim 1, in which the ratio is 3:1 to 10:1.
3. Process of claim 1, in which a gas containing over 70% hydrogen is employed rather than pure hydrogen.
4. Process of claim 1, in which the cumene bottoms are present in a quantity of 1 to 10% by weight with respect to the toluene.

References Cited

UNITED STATES PATENTS

| | | | |
|---|---|---|---|
| 3,296,323 | 1/1967 | Myers et al. | 260—672 |
| 3,374,280 | 3/1968 | Carr et al. | 260—672 |
| 3,110,745 | 11/1963 | Peck et al. | 260—672 |
| 3,178,485 | 4/1965 | Myers | 260—672 |
| 2,381,522 | 8/1945 | Stewart | 196—50 |
| 3,160,671 | 12/1964 | Feigelman et al. | 260—672 |
| 2,924,569 | 2/1960 | Souby | 208—107 |
| 3,171,862 | 3/1965 | Larkins et al. | 260—672 |
| 2,768,219 | 10/1956 | Hoffmann et al. | 260—672 |
| 3,293,308 | 12/1966 | Vol-Epstein | 260—621 |
| 2,211,524 | 8/1940 | Stanley et al. | 260—672 |
| 3,213,150 | 10/1965 | Cabbage | 260—667 |

FOREIGN PATENTS 13,623   1963   Japan.

OTHER REFERENCES

Fowle & Pitts: "Thermal Hydrodealkylation," Chem. Eng. Progress 58 (4) 37–40, (April 1962).

DELBERT E. GANTZ, Primary Examiner

G. E. SCHMITKONS, Assistant Examiner